United States Patent [19]

Brown et al.

[11] Patent Number: 4,807,765

[45] Date of Patent: Feb. 28, 1989

[54] MOBILE STORAGE APPARATUS

[75] Inventors: Billy R. Brown, Franklin; A. Edwin Anderson, Columbia, both of Tenn.

[73] Assignee: Nashville Wire Products Mfg. Co., Inc., Nashville, Tenn.

[21] Appl. No.: 98,300

[22] Filed: Sep. 18, 1987

[51] Int. Cl.$^4$ .................................................. A47F 5/00
[52] U.S. Cl. ...................... 211/162; 211/126; 211/133
[58] Field of Search ............ 211/162, 151, 126, 133; 312/201, 250; 104/110, 118, 242, 249, 251, 250

[56] References Cited

U.S. PATENT DOCUMENTS

| | | | |
|---|---|---|---|
| 2,166,704 | 7/1939 | Foulkes | 312/201 X |
| 2,915,195 | 12/1959 | Crosby | 312/201 X |
| 3,286,651 | 11/1966 | Dahl, Jr. | 104/118 X |
| 4,084,125 | 4/1978 | King | 312/201 X |

Primary Examiner—J. Franklin Foss
Assistant Examiner—Sarah A. Lechok Eley
Attorney, Agent, or Firm—Harrington A. Lackey

[57] ABSTRACT

A mobile storage apparatus incorporating a plurality of storage carts arranged side-by-side and having casters on opposite sides of each cart supporting said carts on a floor surface for independent front-to-rear movement between a storage position and a loading position, the casters on adjacent sides of each pair of the carts being rollably received in a pair of elongated track channels forming a track member supported on said floor surface, whereby only the casters on one side of each cart is rollably received within a track channel of a track member and the casters on the opposite side of each cart are freely rollably supported upon the floor surface.

3 Claims, 2 Drawing Sheets

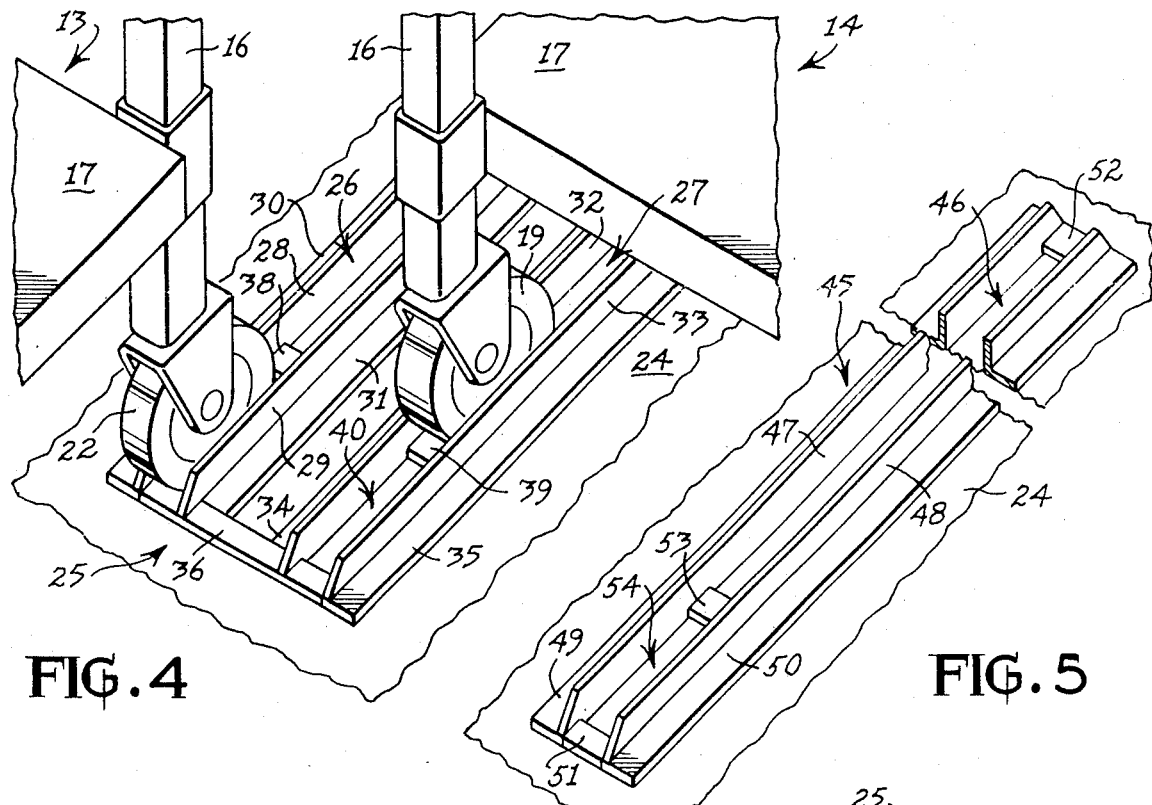
FIG. 4
FIG. 5
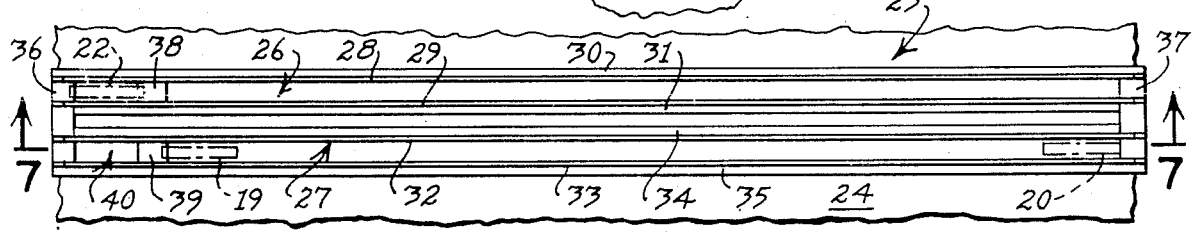
FIG. 6
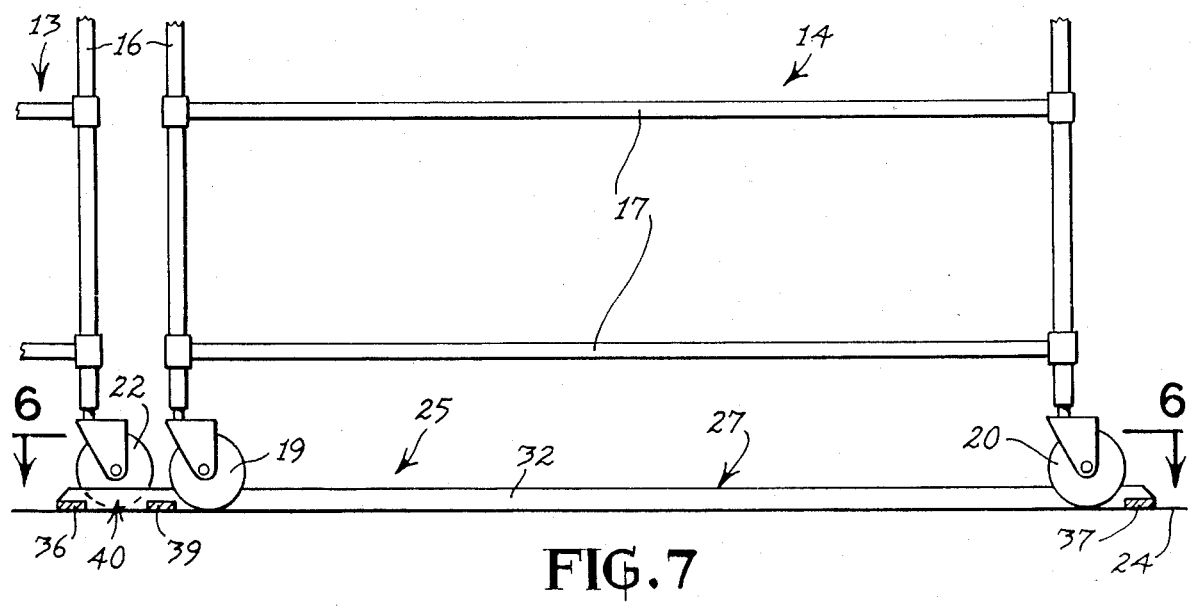
FIG. 7

MOBILE STORAGE APPARATUS

BACKGROUND OF THE INVENTION

This invention relates to a mobile storage apparatus, and more particularly to a track system supporting a plurality of storage carts normally side-by-side for independent front-to-rear movement.

Heretofore, storage carts including shelves and floor-supporting casters have been arranged in storage systems in which the carts are aligned transversely with one cart removed to provide a space between any pair of carts for access to an adjacent cart. Access is gained to a particular cart by transversely shifting the other carts until an open space is formed adjacent the cart to which access is desired. Similar prior art storage systems are disclosed in the following U.S. Pat. Nos.

| 2,915,195 | Crosby | Dec. 1, 1959 |
| 4,607,896 | Peterman (FIG. 1) | Aug. 26, 1986 |

Storage systems including storage units arranged side-by-side in a transverse row and adapted to be moved forward and rearward longitudinally in order to expose openings in the sides of the units for accessability, are disclosed in the following patents:

| U.S. Pat. Nos. | | |
| --- | --- | --- |
| 4,061,379 | Randall | Dec. 6, 1977 |
| 4,084,125 | King | Apr. 11, 1978 |
| 4,123,126 | Querengasser | Oct. 31, 1978 |

| FOREIGN PATENTS | | |
| --- | --- | --- |
| France 1,482,549 | Wilde & Co. | Apr. 17, 1967 |

The Randall U.S. Pat. No. 4,061,379 discloses a storage locker system in which each unit in the form of a row of lockers is supported upon floor-engaging wheels 15 and also by an overhead track carrier 14 which is located centrally of each row of lockers. The length of the overhead track defines the limit of forward movement of the row of lockers. None of the floor-engaging guide wheels 15 rolls in a track.

In the mobile shelving unit of the King U.S. Pat. No. 4,084,125, four storage units are disclosed in which the two central units are fixed relative to the floor, and only the end units are free to move longitudinally. No tracks are utilized.

The Querengasser U.S. Pat. No. 4,123,126 discloses shelving units, each of which includes a pair of rear corner wheels adapted to travel in tracks which extend only the length of the shelving unit, to prevent tracks from extending forward beyond the row of units and thereby creating obstacles and maintenance and cleaning problems. The Querengasser shelving units also include a pair of front wheels which are free to roll on the floor, but are not confined by tracks.

FIG. 1 of the French patent discloses a storage unit 10' which has been moved forward from a transverse row of other storage units and which moves on a pair of parallel tracks 12.

None of the above patents discloses a storage system in which adjacent storage units or racks have supporting wheels or casters along adjacent sides of the units traveling in adjacent track channels of a double track member with the casters on the opposite sides of the units traveling freely on the floor without track confinement.

SUMMARY OF THE INVENTION

It is therefore an object of this invention to provide a mobile storage apparatus utilizing storage carts, preferably having shelves and provided with casters for front-to-rear longitudinal movement, in and out of a transverse line of carts normally arranged side-by-side in a storage position.

A plurality of double track members, each including a pair of adjacent track channels, are supported upon the floor surface for guiding every other pair of adjacent casters mounted on adjacent sides of each successive pair of carts. Thus, only the casters on one side of any cart are rollably carried in a track channel. The casters on the opposite side of each cart roll freely upon the floor surface without constraint by a guide rail or track. Such an arrangement provides adequate guidance for front-to-rear movement of any cart, so that any cart may be pulled forward to a position accessible from the sides for loading or unloading that cart and subsequently to restore the cart to its original storage position in its transverse line of carts.

Furthermore, this minimum number of double tracks occupy a minimum of floor space.

Moreover, a maximum floor area is provided between the tracks for cleaning and maintenance when the carts are removed, and the widely spaced tracks present fewer obstacles.

Furthermore, each track channel is provided with a caster recess at the front thereof for providing a temporary seat for the rear caster of a cart which has been moved forward to its loading position to stabilize the cart during the loading or unloading procedure.

BRIEF DESCRIPTION OF THE DRAWINGS

FIG. 4 is an enlarged fragmentary front perspective view of a double track member supporting one cart in its inoperative storage position and an adjacent cart in its forward loading position, taken generally along the line 4—4 of FIG. 3;

FIG. 5 is a top front perspective view of a track member including a single track channel, with portions broken away;

FIG. 6 is a fragmentary top plan view taken along the line 6—6 of FIG. 7 of a double track member illustrating the casters of adjacent carts, in phantom, in the same relative positions as those disclosed in FIG. 4; and FIG. 7 is a sectional elevation taken along the line 7—7 of FIG. 6, with the carts shown fragmentarily.

DESCRIPTION OF THE PREFERRED EMBODIMENTS

Figure 1:
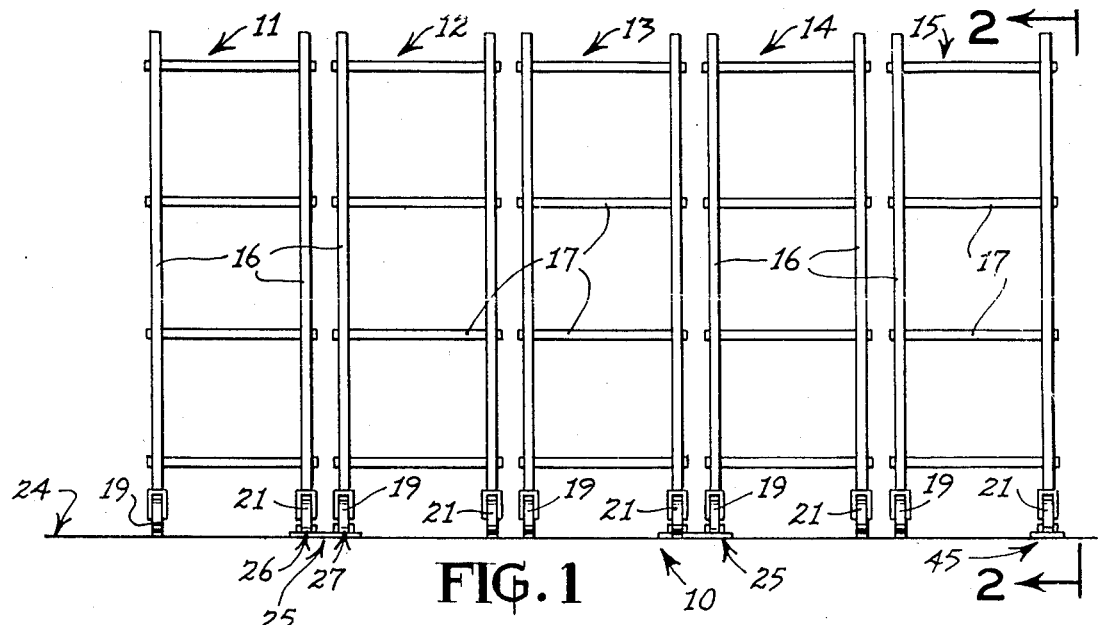
FIG. 1 discloses a front elevational view of five carts supported in transverse alignment in storage position within track members made in accordance with this invention.
Figure 2:
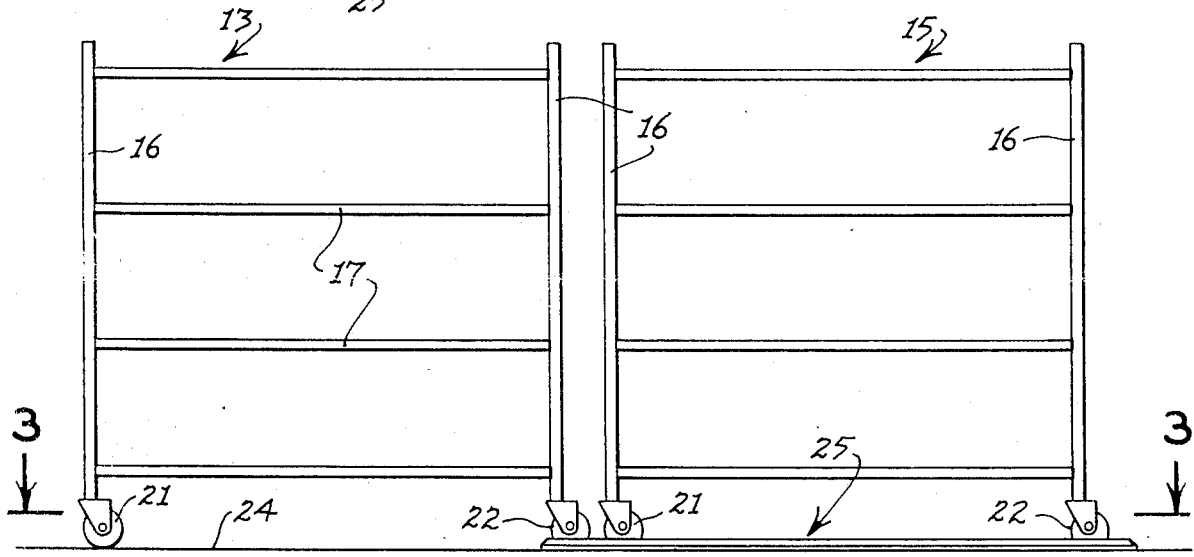
FIG. 2 is a side elevational view taken along the line 2—2 of FIG. 1, illustrating one of the carts moved to its forward loading position.
Figure 3:
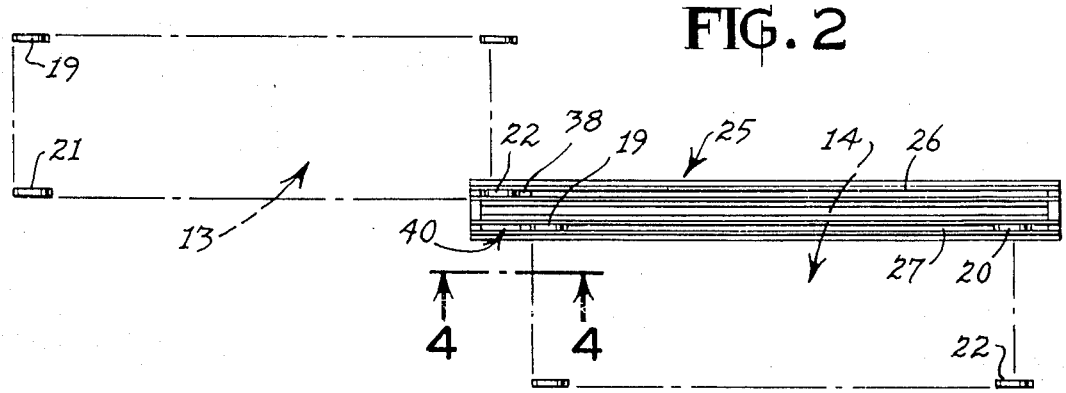
FIG. 3 is a top plan view of some of the track members disclosed in FIG. 1, taken along the line 3—3 of FIG. 2, with the corresponding carts disclosed in phantom.
Figure 3:
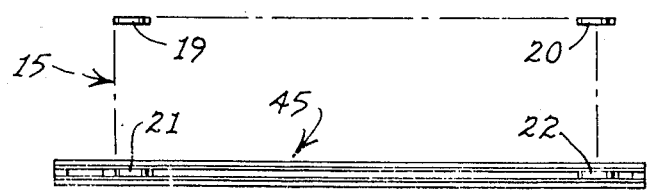

Referring now to the drawings in more detail, FIG. 1 discloses a mobile storage apparatus or track system 10 incorporating a series of five storage carts 11, 12, 13, 14, and 15, of rectangular shape, arranged side-by-side in transverse alignment in an inoperative storage position, each cart, such as the cart 15 is provided with vertical support posts 16 at each corner carrying a plurality of vertically spaced shelves 17. Mounted upon the bottom end of each post 16 is a wheel or caster arranged in longitudinally aligned pairs on opposite sides of each cart, and specifically (looking forward) a right front caster 19, a right rear caster 20, a left front caster 21, and a left rear caster 22, (FIG. 3).

All of the casters 19–22 are designed to roll freely upon the horizontal floor surface 24.

Supported upon the floor surface 24 in the storage position are plurality of transversely spaced, elongated, double track members 25. Each track member 25 includes a pair of closely spaced elongated track channels 26 and 27, which may be constructed of a pair of opposed angle pieces or angle irons. The first track channel 26 may include a pair of transversely opposed angle pieces having parallel adjacent upstanding guide flanges 28 and 29 with outward lateral projecting horizontal flanges 30 and 31. The opposed angle pieces may provide an open bottom so that the caster received between the upstanding parallel guide flanges 28 and 29 may rollably bear upon the floor surface 24. In like manner, a second track channel 27 may be provided with a pair of opposed angle pieces having transversely spaced parallel upstanding guide flanges 32 and 33 and laterally outward directed horizontal flanges 34 and 35. The front side of the angle pieces terminate and are fixed to a transverse front end bar 36, while the rear end of the angle pieces terminate in a transverse rear end bar 37.

Spaced behind the front end bar 36 in each of the track channels 26 and 27 is a transverse rib member 38 and 39. The space between each rib member 38 and 39 and the front end bar 36 provides a recess 40 for receiving a caster in the corresponding track channel, and particularly the rear caster when its corresponding cart has been pulled forward to a loading position, such as that disclosed in FIGS. 3, 4, 6, and 7.

As illustrated in FIG. 1, each double-track member 25 is located between an adjacent pair of carts, such as between the carts 11 and 12 and between the carts 13 and 14.

Where there are an even number of transversely aligned carts, such as the four carts 11, 12, 13, and 14, as illustrated in FIG. 1, the right front and rear casters 19 and 20 of the cart 11 are supported freely upon the floor surface 24 and are not contained within a track member 25. However, the opposite longitudinally aligned pair of casters, which would be the left front caster 21 and the left rear caster 22, would be received in the first track channel 26 of the first track member 25 for free rollable movement confined to a front-to-rear direction. Likewise, the right front and rear casters 19 and 20 of the cart 12 are rollably received within the adjacent second track channel 27 of the first track member 25, while casters on the opposite side of the cart 12 are freely borne upon the floor surface 24 without any track guidance. The right casters 19 and 20 of the third cart 13 adjacent the left casters of the cart 12 are likewise freely supported upon the floor surface 24 without any track guidance. However, the left casters 21 and 22 of the cart 13 are received in the first channel 26 of the second double-track member 25, while the adjacent pair of front and rear casters 19 and 20 of the cart 14 are supported in the adjacent second track channel 27 of the second track member 25. The outside left front and rear casters of the cart 14 are freely supported upon the floor surface 24.

Thus, each front and rear aligned casters on one side of a cart are supported in a corresponding track channel of a track member, while the front and rear casters on the opposite side of the same cart are freely supported upon the floor without any track guidance.

Where the total number of transversely aligned carts is an odd number, such as the five carts 11–15 disclosed in FIG. 1, the odd cart, such as the cart 15, has its casters adjacent the next cart 14 freely supported upon the floor surface 24. However, the casters on the opposite side of the odd cart 15, such as the front left caster 21 and the rear left caster 22, are supported in a single track member 45 having a single track channel 46 of the same construction as either of the track channels 26 and 27 of the double-track member 25. Thus, as best disclosed in FIG. 5, the track channel 46 is provided with a pair of transversely spaced parallel upstanding guide flanges 47 and 48, with outwardly directed horizontal lateral flanges 49 and 50, a front end bar 51, a rear end bar 52 and a transverse rib member 53 defining a front recess 54. The single track member 45 is designed to accommodate the longitudinally aligned casters on the opposite side of an odd cart, such as the cart 15, in the transverse row.

When it is desired to gain access to any one of the carts, such as the cart 13 illustrated in FIGS. 3, 4, 6, and 7, the cart may be manually pushed or pulled forward from its inoperative storage position in transverse alignment with the remaining carts 11 and 13–15, to a forward loading position, as illustrated in FIG. 3. Preferably, a left front caster 21 of cart 13 is pushed forward over the barrier provided by the front end bar 36 until the longitudinally aligned rear caster 22 rides over the rib member 38 and is seated in the corresponding recess 40. The size of the recess 40 is such that the caster 22 is confined against any rolling movement while its corresponding cart, such as cart 13, is in its forward static loading position in order to render the cart stable while it is being loaded or unloaded.

If it is desired to enter between two carts, such as the carts 12 and 14, the cart 13 may be pulled even farther forward, and the rear caster 22 may roll over the front end bar 38 with a minimum of manual effort exerted by the operator. The apparatus 10 made in accordance with this invention utilizes a minimum of track structure because of the utilization of a pair of track channels in a unitary double-track member, which permits wider spacing of the track members, and utilization of only half as many track members as would normally be required for accommodating every longitudinally aligned pair of casters. Moreover, the areas between the track members 25 may be easily cleaned and maintained because of a greater amount of floor space created between the track members, when the carts are removed from the track members.

What is claimed is:

1. A mobile storage appratus comprising:
   (a) a horizontal floor surface, (b) a pair of storage carts, each cart having a front end, a rear end, opposite sides, and a front-to-rear longitudinal axis, (c) each cart having a pair of longitudinally aligned front and rear floor-engaging casters depending from each side of said cart and rollably supporting said cart upon said floor surface, (d) an elongated track member having an elongated pair of adjacent first and second parallel track channels supported on said floor surface, said track channels terminating in front and rear ends, (e) said first track channel receiving said front and rear casters on one side of one of said carts for rolling movement in and along said first track channel, (f) said second track channel receiving said front and rear casters on the side of said other storage cart adjacent said one storage cart for rolling movement in and along said second track channel, (g) said casters on the adjacent sides of said carts being received in said corresponding first and second channels between said front and rear ends when said carts are in an operative side-by-side storage position, (h) said front ends of said track channels comprising relatively low barriers normally to limit forward movement of said front casters in said corresponding track channels yet low enough to permit said front casters to pass over said corresponding barriers when manually pushed forward to a forward loading position in front of said storage position, and (i) said front and rear casters on the opposite side of each of said carts from the casters rollably received within a corresponding trach channel being rollably supported solely by said horizontal floor surface free of any track member.

2. The invention according to claim 1 in which said pair of carts comprises a first pair and further comprising a second pair of said storage carts arranged serially side-by-side relative to each other and to said first pair of storage carts in said inoperative storage position, said elongated track member comprising a first track member, and further comprising a second elongated track member identical to said first track member supported on said floor surface parallel to and transversely spaced from said first track member a distance to permit the adjacent front and rear casters of a second pair of carts to be received in the corresponding adjacent track channels of said second track member for rolling movement, said second track member being spaced from said first track member a distance to permit the cart in said first pair and the cart in said second pair which are adjacent to each other to be transversely spaced a distance substantially equal to the spacing between the carts in each of said first and second pairs of carts in said storage position, said front and rear casters on the opposite side of each of said carts from the casters rollably received within a corresponding track channel being rollably supported solely by said horizontal floor surface free of any track members.

3. The invention according to claim 1 further comprising a front transverse rib member spaced behind said front end of said corresponding track channel to provide a recess between said rib member and said front end for receiving a caster rollably received within said corresponding track channel.

* * * * *